(12) United States Patent
Lin et al.

(10) Patent No.: US 9,007,341 B2
(45) Date of Patent: Apr. 14, 2015

(54) TOUCH SYSTEM

(71) Applicant: Himax Technologies Limited, Tainan (TW)

(72) Inventors: Chang-Hui Lin, Tainan (TW); Yaw-Guang Chang, Tainan (TW)

(73) Assignee: Himax Technologies Limited, Tainan (TW)

( * ) Notice: Subject to any disclaimer, the term of this patent is extended or adjusted under 35 U.S.C. 154(b) by 87 days.

(21) Appl. No.: 13/926,787

(22) Filed: Jun. 25, 2013

(65) Prior Publication Data

US 2014/0375595 A1   Dec. 25, 2014

(51) Int. Cl.
*G06F 3/045* (2006.01)
*G06F 3/041* (2006.01)
*G06F 3/044* (2006.01)

(52) U.S. Cl.
CPC ..................................... *G06F 3/044* (2013.01)

(58) Field of Classification Search
CPC .......... G06F 3/041; G06F 3/044; G06F 3/047
USPC .................................................. 345/173–174
See application file for complete search history.

(56) References Cited

U.S. PATENT DOCUMENTS

2012/0056841 A1* 3/2012 Krenik et al. .................. 345/174
2014/0327644 A1* 11/2014 Mohindra ...................... 345/174

* cited by examiner

*Primary Examiner* — Kenneth Bukowski
(74) *Attorney, Agent, or Firm* — Donald E. Stout; Stout, Uxa & Buyan, LLP

(57) ABSTRACT

In a touch system, a transmitter (TX) driving unit generates at least one pair of orthogonal drive signals, each pair having a specific frequency. At least one pair of TX electrode lines is simultaneously driven by the at least one pair of orthogonal drive signals, respectively. A sense signal is induced on a receiver (RX) electrode line by capacitances disposed between the TX electrode lines and the RX electrode line. An RX detection unit detects the sense signal to simultaneously result in two sense components that respectively estimate the capacitances associated with the TX electrode lines of the pair.

11 Claims, 6 Drawing Sheets

TOUCH SYSTEM

BACKGROUND OF THE INVENTION

1. Field of the Invention

The present invention generally relates to a touch system, and more particularly to a touch system in which at least one pair of electrode lines may be simultaneously driven and detected.

2. Description of Related Art

A touch screen is an input/output device that combines touch technology and display technology to enable users to directly interact with what is displayed. FIG. 1 shows waveforms of driving signals conventionally used to drive a touch screen. Specifically, during period $t_0$ to $t_3$, while a first electrode line associated with a driving signal TX1 is driven, other electrode lines (e.g., a second and a third electrode lines associated with driving signals TX2 and TX3) should be waited. In the same manner, the second electrode line is driven during period $t_3$ to $t_6$, and the third electrode line is driven during period $t_6$ to $t_9$. Therefore, a large amount of time from $t_0$ to $t_9$ is needed to complete driving three electrode lines.

It is worth noting that the conventional driving scheme as demonstrated above cannot be adapted to an advanced touch screen with bigger panel size and/or larger resolution for the reason that a signal processor cannot complete driving and detection in time without detection loss.

For the foregoing reasons, a need has arisen to propose a novel scheme to substantially increase driving speed.

SUMMARY OF THE INVENTION

In view of the foregoing, it is an object of the embodiment of the present invention to provide a touch system in which at least one pair of electrode lines may be simultaneously driven and detected. In one embodiment, a partial window is adopted to attenuate noise without substantially increasing its bandwidth.

According to one embodiment, a touch system includes a transmitter (TX) driving unit, at least one pair of TX electrode lines, a receiver (RX) electrode line, and an RX detection unit. The TX driving unit is configured to generate at least one pair of orthogonal drive signals, each pair having a specific frequency. The at least one pair of TX electrode lines is simultaneously driven by the at least one pair of orthogonal drive signals, respectively. A sense signal is induced on the RX electrode line by capacitances disposed between the TX electrode lines and the RX electrode line. The RX detection unit is configured to detect the sense signal to simultaneously result in two sense components that respectively estimate the capacitances associated with the TX electrode lines of the pair.

DETAILED DESCRIPTION OF THE INVENTION

Figure 1:
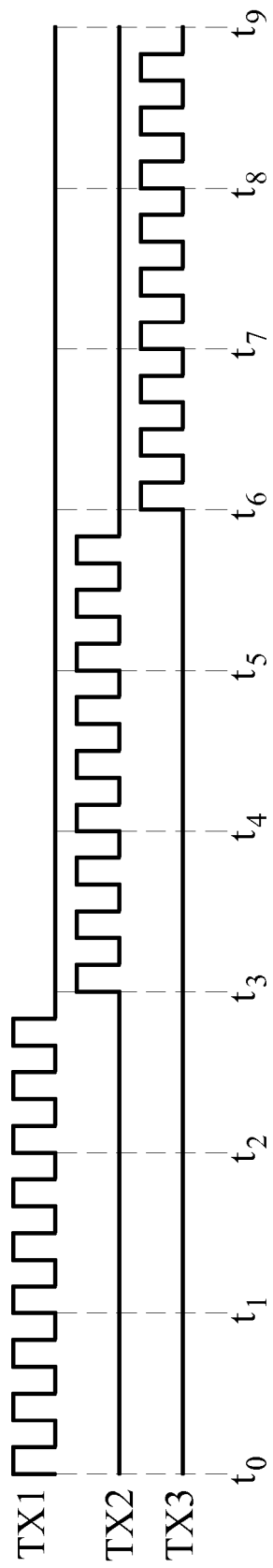
FIG. 1 shows waveforms of driving signals conventionally used to drive a touch screen.
Figure 2A:
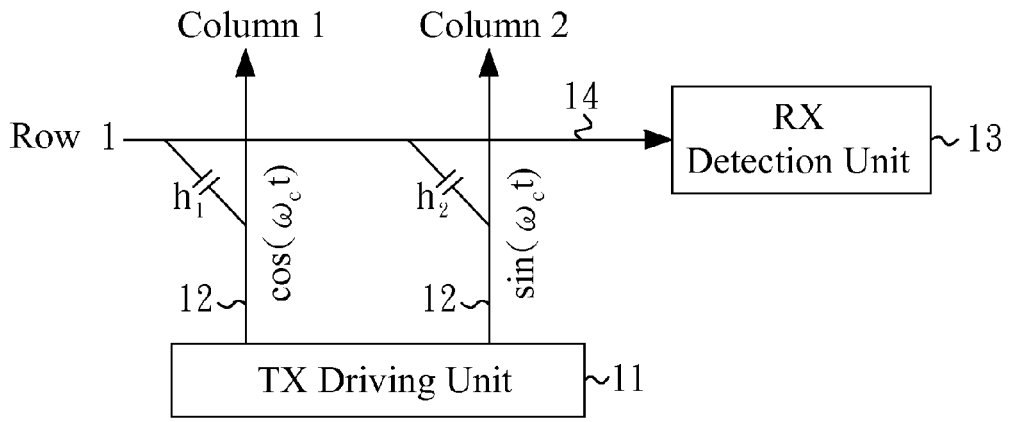
FIG. 2A shows a schematic diagram illustrative of a touch system according to one embodiment of the present invention.

FIG. 2A shows a schematic diagram illustrative of a touch system 100 according to one embodiment of the present invention. The touch system 100 may be implemented, for example, in a touch panel or a touch screen (such as an in-cell touch screen). In the embodiment, a transmitter (TX) driving unit 11 generates a pair of orthogonal drive signals with a same frequency for simultaneously driving a pair of TX electrode lines 12 (e.g., column 1 and column 2 as shown). The pair of orthogonal drive signals of the embodiment includes a cosine signal $\cos(\omega_c t)$ and a sine signal $\sin(\omega_c t)$, where $\omega_c$ is a carrier frequency.

The touch system 100 also includes a receiver (RX) detection unit 13 coupled to receive and detect a sense signal that is induced on an RX electrode line 14 (e.g., row 1 as shown). For brevity, only one RX electrode line 14 is illustrated. The sense signal is induced due to (or via) capacitances (e.g., $h_1$ and $h_2$ as shown) disposed between the TX electrode lines and the RX electrode line, and the capacitances may be affected, for example, by a finger touched above the TX/RX electrode lines. Therefore, the induced sense signal with affected capacitance may then be used, in companion with the TX electrode lines, to determine the touched position.

Figure 2B:
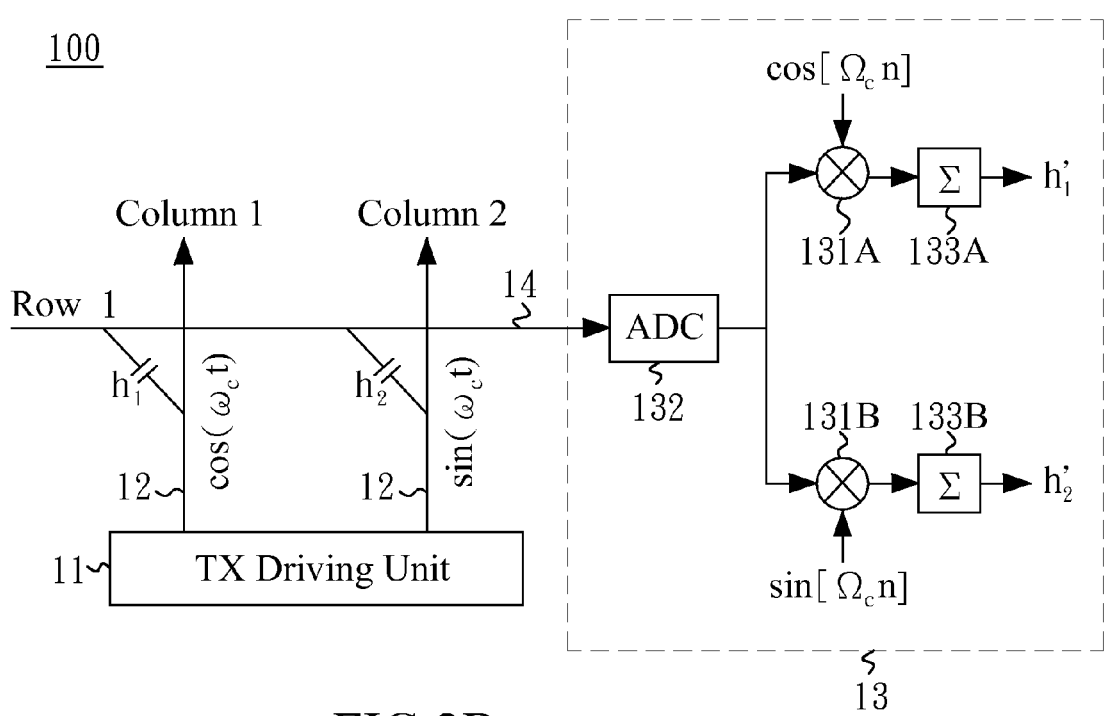
FIG. 2B shows the touch system of FIG. 2A with a detailed RX detection unit.

According to one aspect of the embodiment, the induced sense signal on the RX electrode line (e.g., row 1) may be detected (or demodulated) to simultaneously result in two sense components (that respectively estimate the capacitances mentioned above) with respect to the TX electrode lines (e.g., column 1 and column 2) of the pair, respectively, owing to orthogonality of the drive signals on the pair of TX electrode lines. FIG. 2B shows the touch system 100 of FIG. 2A with a detailed RX detection unit 13. In the specific embodiment shown in FIG. 2B, an in-phase quadrature (IQ) demodulator is used to simultaneously demodulate the sense signal with two orthogonal demodulate signals with a same frequency. Specifically speaking, the IQ demodulator includes a first mixer 131A (e.g., a multiplier) that is configured to multiply the sense signal by $\cos(\Omega_c t)$, and a second mixer 131B (e.g., a multiplier) that is configured to multiply the sense signal by $\sin(\Omega_c t)$, where $\Omega_c = \omega_c / f_s$, $f_s$ is a sampling frequency.

An analog-to-digital converter (ADC) 132 may be further included in the RX detection unit 13 such that the first and second mixers 131A/131B may be operated in digital domain, for example, by a digital signal processor. A first accumulator 133A and a second accumulator 133B (e.g., summing devices) may be further included in the RX detection unit 13 to be coupled to outputs of the first and second mixers 131A/131B, respectively, and configured to sum up Fourier series coefficients as the sense signal may be expressed in Fourier series. Although the RX detection unit 13 as demonstrated in FIG. 2B is operated in digital domain, it is appreciated that the RX detection unit 13 may be operated in analog domain instead. In that case, the first and second accumulators 133A/133B may then be replaced with integrators, and the ADC 132 may be coupled to outputs of the integrators instead.

Figure 3:
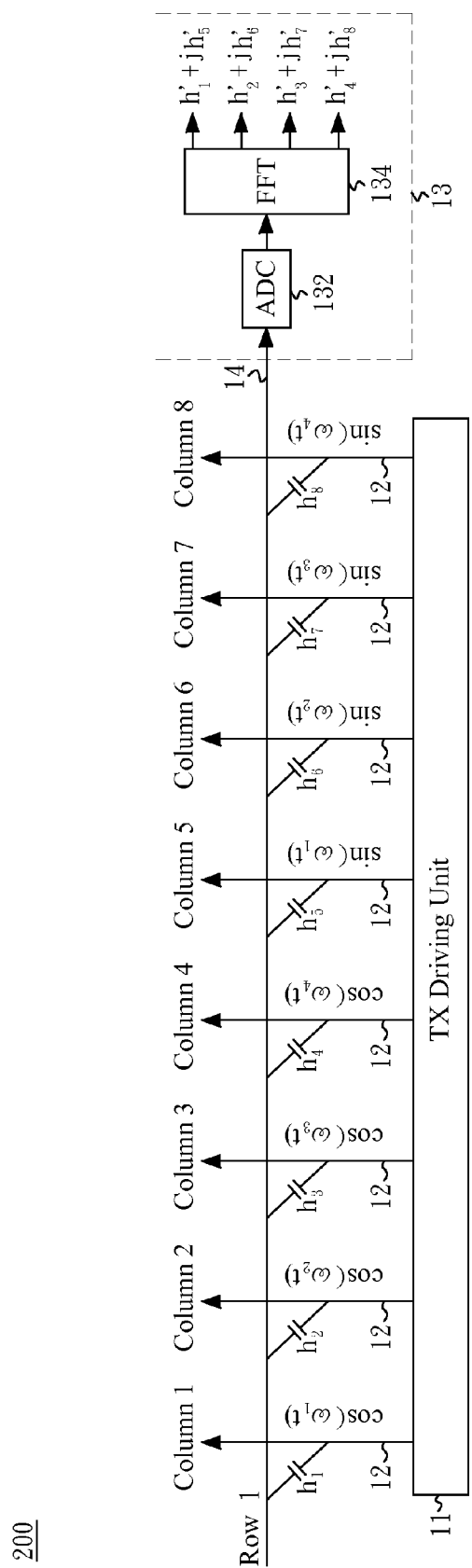
FIG. 3 shows a schematic diagram exemplifying a touch system.

The embodiment illustrated above may be extensively adapted to generating plural pairs of orthogonal drive signals with a specific frequency for each pair, for simultaneously driving plural pairs of TX electrode lines 12, respectively. FIG. 3 shows a schematic diagram, exemplifying a touch system 200 that generates four pairs of orthogonal drive signals having four different frequencies $\omega_1$, $\omega_2$, $\omega_3$ and $\omega_4$, respectively. It is noted that, instead of using mixers 131A/131B and accumulators 133A/133B as in FIG. 2B, a fast Fourier transform (FFT) unit 134 employing an FFT algorithm may be equivalently adopted, for example, in a digital signal processor, to simplify computational complexity. It is also noted that the estimated capacitances by cosine waves demodulation will appear in real part (e.g., $h'_1$, $h'_2$, $h'_3$ and $h'_4$ associated with columns 1 to 4), and the estimated capacitances by sine waves demodulation will appear in imaginary part (e.g., $h'_5$, $h'_6$, $h'_7$ and $h'_8$ associated with columns 5 to 8).

Figure 4A:
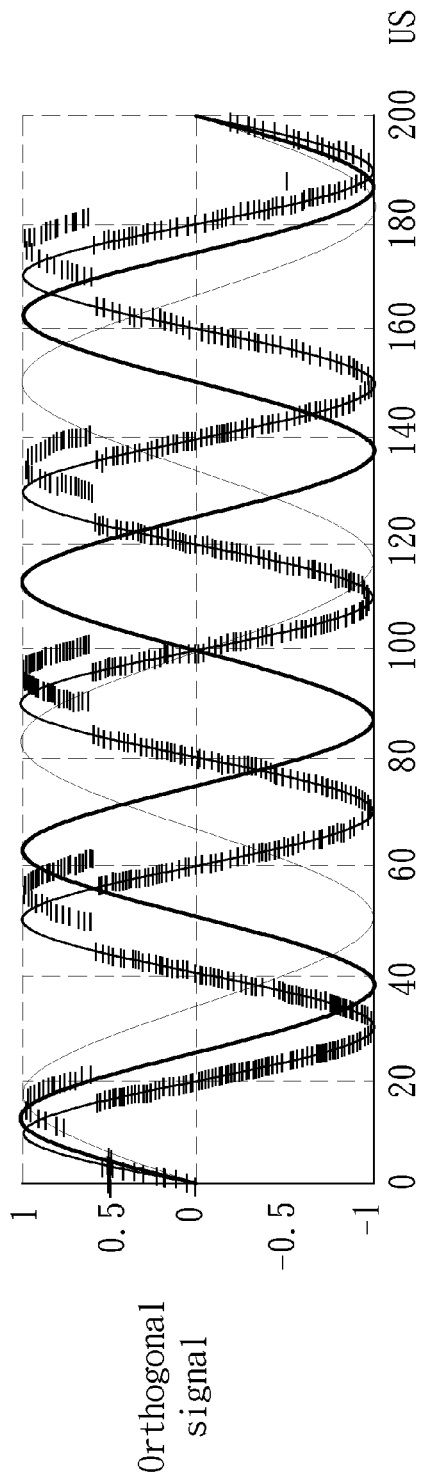
FIG. 4A shows exemplary waveform timing diagram illustrative of adopting three pairs of orthogonal drive signals having three different frequencies, respectively.
Figure 4B:
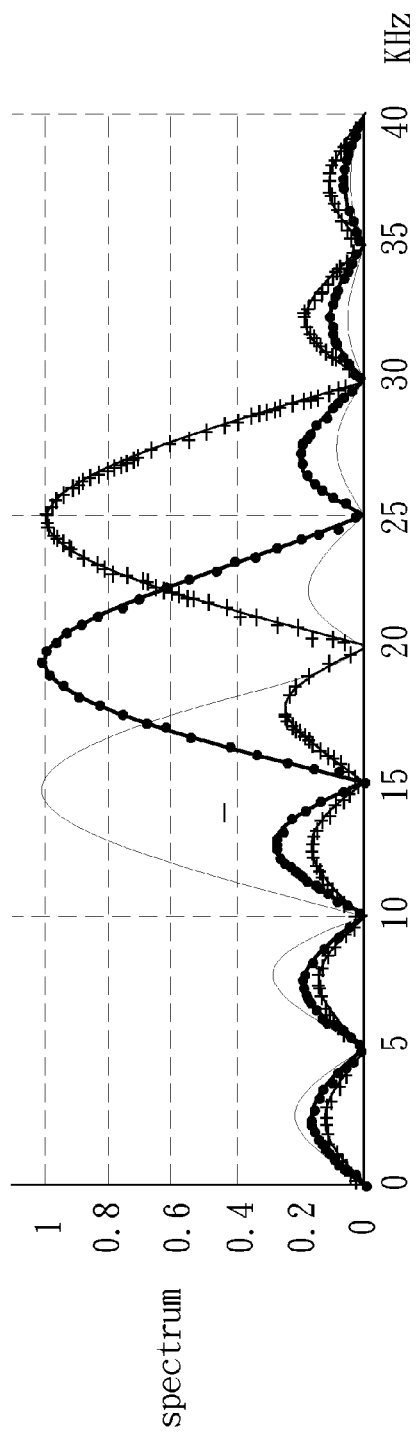
FIG. 4B shows a spectrum corresponding to the orthogonal drive signals of FIG. 4A.

FIG. 4A shows exemplary waveform timing diagram illustrative of adopting three pairs of orthogonal drive signals having three different frequencies, respectively. FIG. 4B shows a spectrum corresponding to the orthogonal drive signals of FIG. 4A. It is observed that the main lobes of the drive signals are separated by 5 kHz, and side lobes' leakage from nearby drive signals to the center frequency of the main lobe is substantially null.

Figure 5:
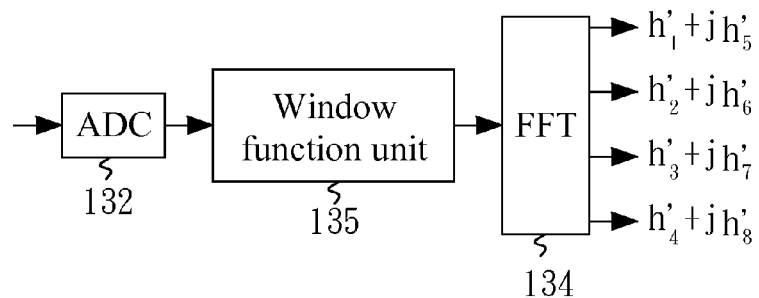
FIG. 5 shows another detailed RX detection unit of FIG. 3.
Figure 6:
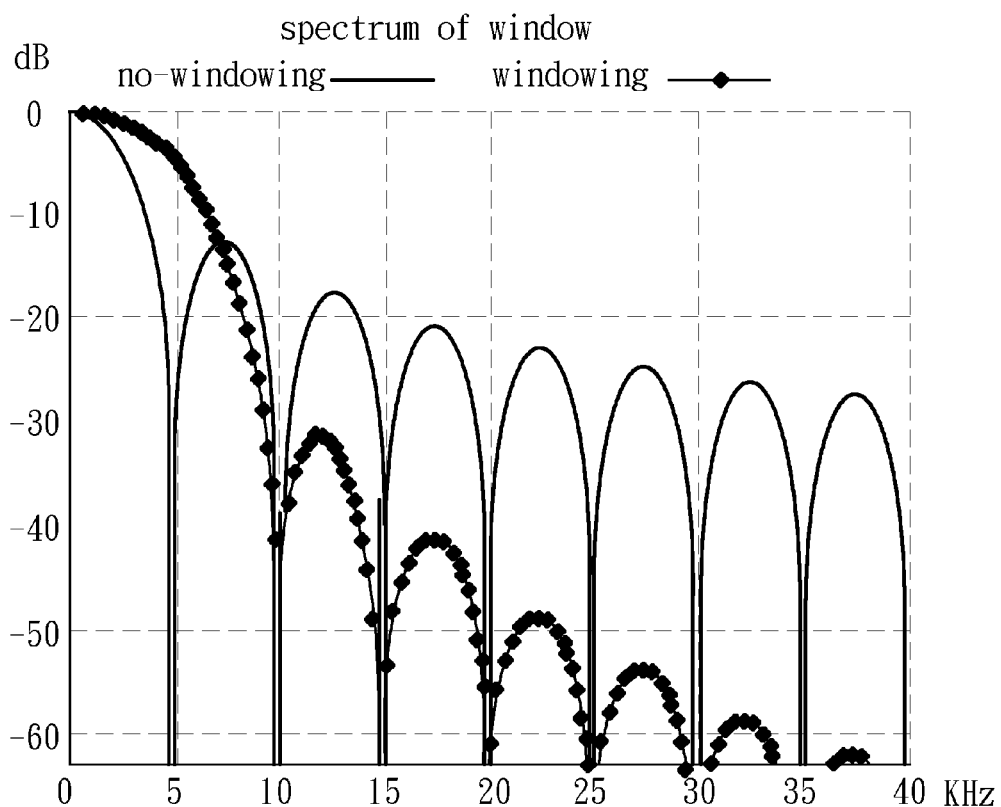
FIG. 6 shows a spectrum with and without adopting Hanning window.

In practical applications with significant (i.e., not negligible) noise, a window function unit 135 may be further used, as exemplified in FIG. 5, to attenuate interference of side lobe from neighboring noise. Specifically, the window function unit 135 is disposed between the ADC 132 and the FFT unit 134. In the specification, a window function (or window) is a mathematical function that is zero-valued outside of a predetermined interval. For instance, a function that is constant inside the interval and zero elsewhere is called a rectangular window. FIG. 6 shows a spectrum with and without adopting Hanning window. The penalty of adopting windowing is a resultant bandwidth of main lobe two times the original bandwidth.

Figure 7A:
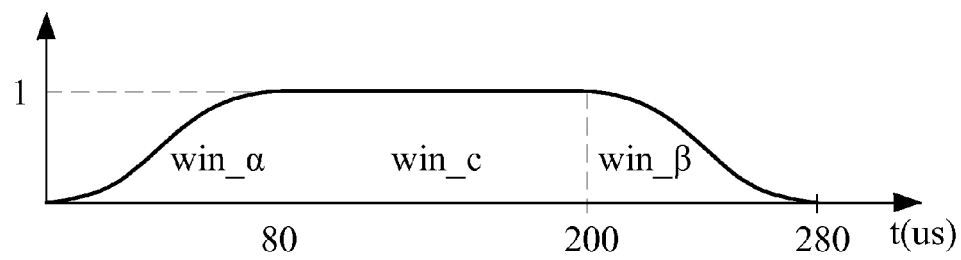
FIG. 7A shows a partial window function according to one embodiment of the present invention.

FIG. 7A shows a partial window (function) according to one embodiment of the present invention. Specifically speaking, the partial window has a center part win_c, a rising part win_α, and a falling part win_β. The center part win_c has a constant value (e.g., 1), the value of the rising part win_α is increasing, for example, from zero toward the constant value of win_c, and the value of the falling part win_β is decreasing, for example, from the constant value of win_c toward zero. The rising part and the falling part are complementary to satisfy the following equation: win_α+win_β=1. For example, the sum of a beginning point of win_α and a beginning point of win_β is equal to the constant value; and the sum of an ending point of win_α and an ending point of win_β is also equal to the constant value.

Figure 7B:
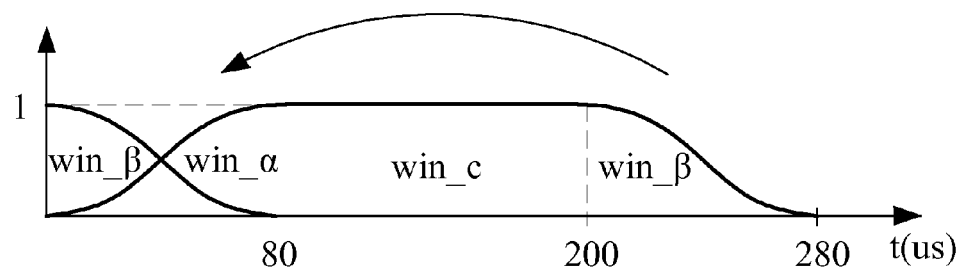
FIG. 7B shows exemplary operation according to the partial window of FIG. 7A.
Figure 8:
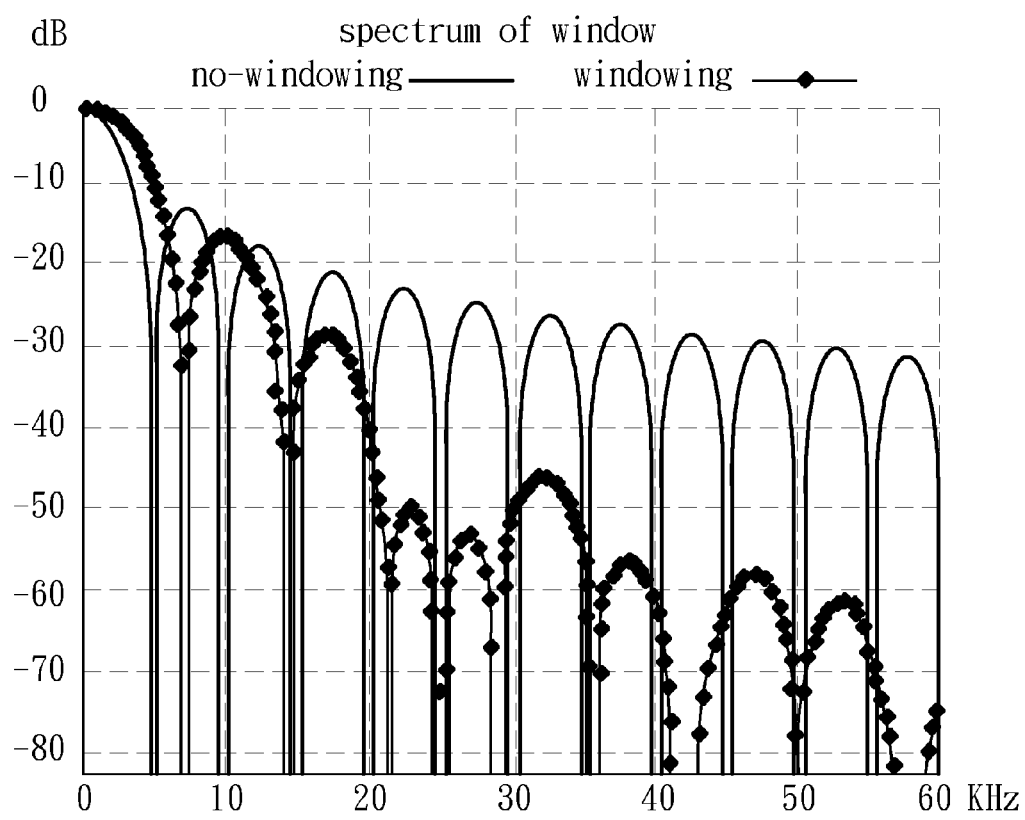
FIG. 8 shows a spectrum with and without adopting the partial window.

FIG. 7B shows exemplary operation according to the partial window of FIG. 7A. Assume the drive signal has a period of 200 μs, and a partial window is defined with a center part win_c from 80 to 200 μs, a rising part win_α from 0 to 80 μs, and a falling part win_β from 200 to 280 μs. In other words, in the embodiment, the sum of win_α and win_c is equal to the period of the drive signal. After the partial window is operated on the sense signal, for example, by inner product, the windowed falling part is moved (leftward) overlapped and added to the windowed rising part, as shown in FIG. 7B, therefore resulting in a reconstructed sense signal, which is subsequently subjected to FFT unit 134. FIG. 8 shows a spectrum with and without adopting the partial window. Compared with FIG. 6, it is observed that the bandwidth of main lobe using the partial window is substantively less than the bandwidth using Hanning window.

Although specific embodiments have been illustrated and described, it will be appreciated by those skilled in the art that various modifications may be made without departing from the scope of the present invention, which is intended to be limited solely by the appended claims.

What is claimed is:

1. A touch system, comprising:
    a transmitter (TX) driving unit configured to generate at least one pair of orthogonal drive signals, each pair having a specific frequency;
    at least one pair of TX electrode lines simultaneously driven by the at least one pair of orthogonal drive signals, respectively;
    a receiver (RX) electrode line on which a sense signal is induced by capacitances disposed between the TX electrode lines and the RX electrode line; and
    an RX detection unit configured to detect the sense signal to simultaneously result in two sense components that respectively estimate the capacitances associated with the TX electrode lines of the pair;
    wherein the RX detection unit further comprises a window function unit configured to perform a window function on the sense signal, the window function comprising a partial window having a center part, a rising part and a falling part, wherein the center part has a constant value, a value of the rising part is increasing, and a value of the falling part is decreasing, the rising part and the falling part being complementary;
    wherein after the partial window is performed on the sense signal, a windowed rising part is resulted from the rising part, and a windowed falling part is resulted from the falling part, and subsequently the windowed falling part is moved overlapped and added to the windowed rising part, thereby resulting in a reconstructed sense signal.

2. The system of claim 1, wherein the pair of orthogonal drive signals comprises a cosine signal and a sine signal with a same carrier frequency.

3. The system of claim 1, wherein the RX detection unit comprises an in-phase quadrature (IQ) demodulator used to simultaneously demodulate the sense signal with two orthogonal demodulate signals having a same frequency.

4. The system of claim 3, wherein the IQ demodulator comprises a first mixer that is configured to multiply the sense signal by a cosine demodulate signal, and a second mixer that is configured to multiply the sense signal by a sine demodulate signal, wherein the cosine demodulate signal and the sine demodulate signal have a same frequency.

5. The system of claim 4, wherein the first mixer comprises a first multiplier, and the second mixer comprises a second multiplier.

6. The system of claim 4, wherein the RX detection unit further comprises an analog-to-digital converter (ADC) that is coupled to receive the sense signal and generates an output fed to the first mixer and the second mixer.

7. The system of claim 4, wherein the RX detection unit further comprises a first accumulator and a second accumulator coupled to outputs of the first mixer and the second mixer, respectively.

8. The system of claim 7, wherein the first accumulator and the second accumulator are configured to sum up Fourier series coefficients as the sense signal is expressed in Fourier series.

9. The system of claim 7, wherein the first accumulator comprises a first summing device, and the second accumulator comprises a second summing device.

10. The system of claim 1, wherein the window function comprises Hanning window.

11. The system of claim 1, wherein the partial window is performed on the sense signal by inner product.

* * * * *